United States Patent
Oinuma et al.

(10) Patent No.: US 11,333,851 B2
(45) Date of Patent: May 17, 2022

(54) CAMERA OPTICAL LENS

(71) Applicant: AAC Optics Solutions Pte. Ltd., Singapore (SG)

(72) Inventors: Kenji Oinuma, Shenzhen (CN); Lei Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 208 days.

(21) Appl. No.: 16/676,466

(22) Filed: Nov. 7, 2019

(65) Prior Publication Data
US 2020/0409076 A1 Dec. 31, 2020

(30) Foreign Application Priority Data
Jun. 30, 2019 (CN) .................. 201910581765.1

(51) Int. Cl.
*G02B 9/62* (2006.01)
*G02B 15/14* (2006.01)
*G02B 7/08* (2021.01)
*G02B 7/10* (2021.01)
*G02B 13/00* (2006.01)

(52) U.S. Cl.
CPC .......... *G02B 9/62* (2013.01); *G02B 7/08* (2013.01); *G02B 7/102* (2013.01); *G02B 13/0045* (2013.01); *G02B 15/142* (2019.08)

(58) Field of Classification Search
CPC .... G02B 13/0045; G02B 15/142; G02B 7/08; G02B 7/102; G02B 9/62; G02B 13/0015; G02B 13/06

USPC ........................................... 359/759
See application file for complete search history.

(56) References Cited

U.S. PATENT DOCUMENTS 9,523,841 B1 * 12/2016 Chen ................. G02B 5/208
2018/0039046 A1 * 2/2018 Lee .................. G02B 13/0045

OTHER PUBLICATIONS

1st Office Action dated Feb. 4, 2020 by JPO in related Japanese Patent Application No. 2019149256 (4 Pages).

* cited by examiner

*Primary Examiner* — Darryl J Collins
*Assistant Examiner* — Matthew Y Lee
(74) *Attorney, Agent, or Firm* — W&G Law Group

(57) ABSTRACT

The present disclosure relates to the technical field of optical lens and discloses a camera optical lens. The camera optical lens includes, from an object side to an image side: a first lens, a second lens having a positive refractive power, a third lens having a negative refractive power, a fourth lens, a fifth lens and a sixth lens. The camera optical lens satisfies the following conditions: $4.00 \leq f1/f \leq 10.00$ and $-40.00 \leq R5/d5 \leq -20.00$, where f denotes a focal length of the camera optical lens; f1 denotes a focal length of the first lens; R5 denotes a curvature radius of an object-side surface of the third lens; d5 denotes an on-axis thickness of the third lens. The camera optical lens can achieve a high imaging performance while obtaining a low TTL.

18 Claims, 7 Drawing Sheets

CAMERA OPTICAL LENS

TECHNICAL FIELD

The present disclosure relates to an optical lens, in particular to a camera optical lens suitable for handheld devices such as a smart phone and a digital camera, and a camera device such as a monitor or a PC lens.

BACKGROUND

With the emergence of smart phones in recent years, the demand for miniature camera lens is gradually increasing, but a photosensitive device of a general camera lens is no other than a charge coupled device (CCD) or a complementary metal-oxide semiconductor sensor (CMOS sensor). Since the progress of the semiconductor manufacturing technology makes a pixel size of the photosensitive device smaller, the current development trend of electronic products is that their functions should be better and their shape should be thin and small, the miniature camera lens with good imaging quality has become a mainstream in the market. In order to obtain better imaging quality, the lens that is traditionally equipped in a mobile phone camera adopts a three-piece or four-piece lens structure. Besides, with the development of technology and the increase of the diverse demands of users, and under this circumstance that the pixel area of the photosensitive device is shrinking and the requirement of the system for the imaging quality is improving constantly, the five-piece, six-piece and seven-piece lens structure gradually appear in a lens design. There is an urgent need for ultra-thin wide-angle camera lenses which have good optical characteristics and fully corrected chromatic aberration.

DETAILED DESCRIPTION OF THE EXEMPLARY EMBODIMENTS

To make the objects, technical solutions, and advantages of the present disclosure clearer, the embodiments of the present disclosure are described in detail with reference to the accompanying drawings in the following. A person of ordinary skill in the related art can understand that, in the embodiments of the present disclosure, many technical details are provided to make readers better understand this application. However, even without these technical details and any changes and modifications based on the following embodiments, technical solutions required to be protected by this application can be implemented.

Embodiment 1

Figure 1:
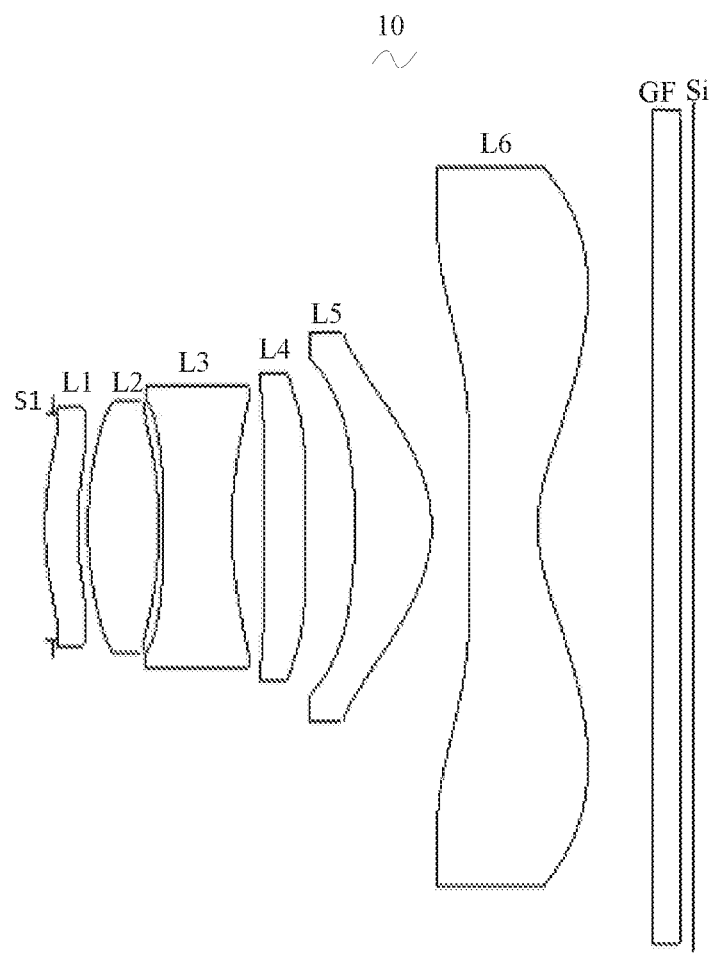
FIG. 1 is a schematic diagram of a structure of a camera optical lens in accordance with Embodiment 1 of the present disclosure.

As referring to the accompanying drawings, the present disclosure provides a camera optical lens 10. FIG. 1 shows the camera optical lens 10 of Embodiment 1 of the present disclosure, the camera optical lens 10 comprises six lenses. Specifically, the camera optical lens 10 includes, from an object-side to an image-side: an aperture S1, a first lens L1, a second lens L2, a third lens L3, a fourth lens L4, a fifth lens L5 and a sixth lens L6. An optical element like an optical filter GF can be arranged between the sixth lens L6 and an image surface Si.

The first lens L1, the second lens L2, the third lens L3, the fourth lens L4, the fifth lens L5, and the sixth lens L6 are made of plastic material.

The second lens has a positive refractive power, and the third lens has a negative refractive power.

Here, a focal length of the camera optical lens is defined as f, and a focal length of the first lens L1 is defined as f1. The camera optical lens 10 satisfies the following condition: $4.00 \leq f1/f \leq 10.00$, which specifies a ratio of the focal length f1 of the first lens L1 and the focal length f of the camera optical lens 10. In this way, the first lens has a positive refractive power. If beyond the lower specified value, though it is beneficial for an ultra-thin lens, the first lens L1 has a relative strong positive refractive power and is difficult for correcting aberration, and is not beneficial for wide-angle development of a lens. On the contrary, if beyond the upper specified value, the first lens L1 has a relative weak positive refractive power, which is difficult for ultra-thin development of a lens.

A curvature radius of an object-side surface of the third lens L3 is defined as R5, an on-axis thickness of the third lens L3 is defined as d5. The camera optical lens 10 satisfies the following condition: $-40.00 \leq R5/d5 \leq -20.00$, which specifies a ratio of the curvature radius R5 of an object-side surface of the third lens L3 and the on-axis thickness d5 of the third lens L3. It is beneficial for correcting an aberration of the camera optical lens, since the focal power of the third lens L3 is controlled within a reasonable range.

A total optical length TTL of the camera optical lens is defined as TTL. That is, a total optical length from an object-side surface of the first lens to an image surface Si of the camera optical lens along an optic axis is defined as TTL.

In the present disclosure, when the focal length f of the camera optical lens 10, the focal length f1 of the first lens L1, the curvature radius R5 of the object-side surface of the third lens L3, and an on-axis thickness d5 of the third lens L3 satisfy the above conditions, the camera optical lens 10 has an advantage of high performance and satisfies a design requirement of low TTL.

In an embodiment, the first lens L1 includes an object-side surface being convex surface in a paraxial region and an image-side surface being concave in the paraxial region, and the first lens L1 has a positive refraction power.

A curvature radius of the object-side surface of the first lens L1 is defined as R1, a curvature radius of the image-side surface of the first lens L1 is defined as R2, and the camera optical lens 10 satisfies the following condition: $-90.02 \leq (R1+R2)/(R1-R2) \leq -7.29$. This can reasonably control a shape of the first lens in such a manner that the first lens can effectively correct a spherical aberration of the camera optical lens. Preferably, the camera optical lens 10 further satisfies the following condition: $-56.26 \leq (R1+R2)/(R1-R2) \leq -9.12$.

An on-axis thickness of the first lens L1 is defined as d1, and the camera optical lens 10 satisfies the following condition: $0.03 \leq d1/TTL \leq 0.08$. When the condition is satisfied, it is beneficial for realization of ultra-thin lenses. Preferably, the camera optical lens 10 further satisfies the following condition: $0.04 \leq d1/TTL \leq 0.06$.

In an embodiment, the second lens L2 includes an object-side surface being convex in the paraxial region and an image-side surface being convex in the paraxial region.

The focal length of the camera optical lens 10 is defined as f, a focal length of the second lens L2 is defined as f2, and the camera optical lens 10 satisfies the following condition: $0.36 \leq f2/f \leq 1.22$. When the condition is satisfied, a positive focal power of the second lens L2 is controlled within a reasonable range, which is beneficial for correcting the aberration of the camera optical lens. Preferably, the camera optical lens 10 further satisfies the following condition: $0.58 \leq f2/f \leq 0.98$.

A curvature radius of the object-side surface of the second lens L2 is defined as R3 and a curvature radius of the image-side surface of the second lens L2 is defined as R4. The camera optical lens 10 satisfies the following condition: $-0.18 \leq (R3+R4)/(R3-R4) \leq 0.08$, which specifies a shape of the second lens L2. Within this range, a development towards ultra-thin and wide-angle lenses would facilitate correcting the problem of an on-axis aberration. Preferably, the camera optical lens 10 further satisfies the following condition: $-0.11 \leq (R3+R4)/(R3-R4) \leq 0.06$.

An on-axis thickness of the second lens L2 is defined as d3, and the camera optical lens 10 satisfies the following condition: $0.05 \leq d3/TTL \leq 0.16$. This can facilitate achieving ultra-thin lenses. Preferably, the camera optical lens 10 further satisfies the following condition: $0.09 \leq d3/TTL \leq 0.13$.

In an embodiment, the object-side surface of the third lens L3 is concave in the paraxial region and an image-side surface of the third lens L3 is concave in the paraxial region.

The focal length of the camera optical lens 10 is defined as f, a focal length of the third lens L3 is defined as f3, and the camera optical lens 10 satisfies the following condition: $-1.92 \leq f3/f \leq -0.59$. An appropriate distribution of the refractive power leads to a better imaging quality and a lower sensitivity. Preferably, the camera optical lens 10 further satisfies the following condition: $-1.20 \leq f3/f \leq -0.74$.

A curvature radius of the object-side surface of the third lens L3 is defined as R5, a curvature radius of the image-side surface of the third lens L3 is defined as R6, and the camera optical lens 10 satisfies the following condition: $0.29 \leq (R5+R6)/(R5-R6) \leq 1.11$. This can effectively control a shape of the third lens L3, thereby facilitating shaping of the third lens and avoiding bad shaping and generation of stress due to an overly large surface curvature of the third lens L3. Preferably, the camera optical lens 10 further satisfies the following condition: $0.46 \leq (R5+R6)/(R5-R6) \leq 0.89$.

An on-axis thickness of the third lens L3 is defined as d5, and the camera optical lens 10 satisfies the following condition: $0.05 \leq d5/TTL \leq 0.16$. This can facilitate achieving ultra-thin lenses. Preferably, the camera optical lens 10 further satisfies the following condition: $0.07 \leq d5/TTL \leq 0.13$.

In an embodiment, the fourth lens L4 includes an object-side surface being convex in the paraxial region, and the fourth lens L4 has a positive refractive power.

The focal length of the camera optical lens 10 is defined as f, a focal length of the fourth lens L4 is defined as f4, and the camera optical lens 10 satisfies the following condition: $3.40 \leq f4/f \leq 16.16$. The appropriate distribution of refractive power makes it possible that the system has the better imaging quality and the lower sensitivity. Preferably, the camera optical lens 10 further satisfies the following condition: $5.45 \leq f4/f \leq 12.93$.

A curvature radius of an object-side surface of the fourth lens L4 is defined as R7 and a curvature radius of the image-side surface of the fourth lens L4 is defined as R8. The camera optical lens 10 satisfies the following condition: $-7.67 \leq (R7+R8)/(R7-R8) \leq 1.24$, which specifies a shape of the fourth lens L4. Within this range, a development towards ultra-thin and wide-angle lens would facilitate correcting a problem like an off-axis aberration. Preferably, the camera optical lens 10 further satisfies the following condition: $-4.79 \leq (R7+R8)/(R7-R8) \leq 0.99$.

An on-axis thickness of the fourth lens L4 is defined as d7, and the camera optical lens 10 satisfies the following condition: $0.03 \leq d7/TTL \leq 0.11$. This can facilitate achieving ultra-thin lenses. Preferably, the camera optical lens 10 further satisfies the following condition: $0.05 \leq d7/TTL \leq 0.08$.

In an embodiment, the fifth lens L5 includes an object-side surface being concave in the paraxial region and an image-side surface being convex in the paraxial region, and the fifth lens L5 has a positive refractive power.

The focal length of the camera optical lens 10 is defined as f and a focal length of the fifth lens L5 is defined as f5. The camera optical lens 10 satisfies the following condition: $0.30 \leq f5/f \leq 1.03$, which can effectively make a light angle of the camera lens gentle and reduce tolerance sensitivity. Preferably, the camera optical lens 10 further satisfies the following condition: $0.49 \leq f5/f \leq 0.83$.

A curvature radius of the object-side surface of the fifth lens L5 is defined as R9 and a curvature radius of the image-side surface of the fifth lens L5 is defined as R10. The camera optical lens 10 satisfies the following condition: $0.76 \leq (R9+R10)/(R9-R10) \leq 2.50$, which specifies a shape of the fifth lens L5. Within this range, a development towards ultra-thin and wide-angle lenses can facilitate correcting a problem of the off-axis aberration. Preferably, the camera optical lens 10 further satisfies the following condition: $1.21 \leq (R9+R10)/(R9-R10) \leq 2.00$.

An on-axis thickness of the fifth lens L5 is defined as d9, and the camera optical lens 10 satisfies the following condition: $0.05 \leq d9/TTL \leq 0.18$. This can facilitate achieving ultra-thin lenses. Preferably, the camera optical lens 10 further satisfies the following condition: $0.09 \leq d9/TTL \leq 0.14$.

In an embodiment, the sixth lens L6 includes an object-side surface being convex in the paraxial region and an image-side surface being concave in the paraxial region. The sixth lens L6 has a negative refractive power.

The focal length of the camera optical lens 10 is defined as f, and a focal length of the sixth lens L6 is defined as f6, and the camera optical lens 10 satisfies the following condition: $-1.34 \leq f6/f \leq -0.40$. The appropriate distribution of the refractive power makes it possible that the system has the better imaging quality and lower sensitivity. Preferably, the camera optical lens 10 further satisfies the following condition: −0.84≤f6/f≤−0.50.

A curvature radius of an object-side surface of the sixth lens L6 is defined as R11 and a curvature radius of the image-side surface of the sixth lens L6 is defined as R12. The camera optical lens 10 satisfies the following condition: 0.55≤(R11+R12)/(R11−R12)≤1.78, which specifies a shape of the sixth lens L6. Within this range, a development towards ultra-thin and wide-angle lenses would facilitate correcting a problem like aberration of the off-axis aberration. Preferably, the camera optical lens 10 further satisfies the following condition: 0.88≤(R11+R12)/(R11−R12)≤1.42.

An on-axis thickness of the sixth lens L6 is defined as d11, and the camera optical lens 10 satisfies the following condition: 0.05≤d11/TTL≤0.20. This can facilitate achieving ultra-thin lenses. Preferably, the camera optical lens 10 further satisfies the following condition: 0.08≤d11/TTL≤0.16.

In an embodiment, the focal length of the camera optical lens 10 is defined as f, a combined focal length of the first lens and of the second lens L2 is defined as f12, and the camera optical lens 10 satisfies the following condition: 0.35≤f12/f≤1.11. This can eliminate the aberration and distortion of the camera optical lens and reduce a back focal length of the camera optical lens, thereby maintaining miniaturization of the camera optical lens. Preferably, the camera optical lens 10 further satisfies the following condition: 0.57≤f12/f≤0.89.

In an embodiment, the total optical length TTL of the camera optical lens 10 is less than or equal to 5.56 mm, which is beneficial for achieving ultra-thin lenses. Preferably, the TTL of the camera optical lens 10 is less than or equal to 5.31 mm.

In an embodiment, an F number of the camera optical lens 10 is less than or equal to 2.27. The camera optical lens 10 has a large F number and a better imaging performance. Preferably, the F number of the camera optical lens 10 is less than or equal to 2.22.

With such design, the total optical length TTL of the camera optical lens 10 can be made as short as possible, thus the miniaturization characteristics can be maintained.

In the following, an example will be used to describe the camera optical lens 10 of the present disclosure. The symbols recorded in each example are as follows. The unit of a focal length, an on-axis distance, a curvature radius, an on-axis thickness, an inflexion point position and an arrest point position are all in units of mm.

TTL: Optical length (a total optical length from the object-side surface of the first lens to an image surface Si of the camera optical lens along an optic axis) in mm.

Preferably, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present disclosure are shown in Table 1 and Table 2.

TABLE 1

| | R | d | nd | vd |
|---|---|---|---|---|
| S1 | ∞ | d0 = −0.060 | | |
| R1 | 2.200 | d1 = 0.254 | nd1 1.6713 | v1 19.24 |
| R2 | 2.300 | d2 = 0.079 | | |

TABLE 1-continued

| | R | d | nd | vd |
|---|---|---|---|---|
| R3 | 2.569 | d3 = 0.551 | nd2 1.5449 | v2 55.93 |
| R4 | −3.082 | d4 = 0.035 | | |
| R5 | −10.783 | d5 = 0.526 | nd3 1.6713 | v3 19.24 |
| R6 | 2.867 | d6 = 0.249 | | |
| R7 | 10.273 | d7 = 0.320 | nd4 1.6510 | v4 21.51 |
| R8 | 17.525 | d8 = 0.387 | | |
| R9 | −4.999 | d9 = 0.597 | nd5 1.5449 | v5 55.93 |
| R10 | −1.028 | d10 = 0.291 | | |
| R11 | 22.893 | d11 = 0.528 | nd6 1.5449 | v6 55.93 |
| R12 | 1.136 | d12 = 0.891 | | |
| R13 | ∞ | d13 = 0.210 | ndg 1.5168 | vg 64.17 |
| R14 | ∞ | d14 = 0.100 | | |

In the table, meanings of various symbols will be described as follows.

S1: aperture;

R: curvature radius of an optical surface, a central curvature radius for a lens;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the sixth lens L6;

R12: curvature radius of the image-side surface of the sixth lens L6;

R13: curvature radius of the object-side surface of the optical filter GF;

R14: curvature radius of the image-side surface of the optical filter GF;

d: on-axis thickness of the lens and on-axis distance between the lens;

d0: on-axis distance from aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the optical filter GF;

d13: on-axis thickness of the optical filter GF;

d14: on-axis distance from the image-side surface to the image surface Si of the optical filter GF;

nd: refractive index of a d line;

nd1: refractive index of a d line of the first lens L1;

nd2: refractive index of a d line of the second lens L2;

nd3: refractive index of a d line of the third lens L3;

nd4: refractive index of a d line of the fourth lens L4;

nd5: refractive index of a d line of the fifth lens L5;

nd6: refractive index of a d line of the sixth lens L6;

ndg: refractive index of a d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

Table 2 shows a spherical surface data of the camera optical lens 10 in the embodiment 1 of the present disclosure.

TABLE 2

| | Conic coefficient | Aspheric surface coefficients | | | | | | |
|---|---|---|---|---|---|---|---|---|
| | k | A4 | A6 | A8 | A10 | A12 | A14 | A16 |
| R1 | −1.7796E+00 | −6.4869E−02 | −1.7682E−01 | 5.3076E−01 | −3.3161E−01 | −1.7850E+00 | 3.3175E+00 | −1.6814E+00 |
| R2 | −7.7410E+00 | −1.1444E−01 | −9.8027E−03 | −3.5438E−02 | −4.3387E−02 | 6.7037E−02 | 1.2885E−01 | −1.6664E−01 |
| R3 | −2.6405E+00 | −5.9287E−02 | 3.9852E−02 | −3.8396E−02 | 1.4790E−01 | 4.4912E−02 | −1.3905E−01 | 1.8629E−02 |
| R4 | −5.1456E−01 | 1.5031E−02 | −3.1877E−02 | 1.7216E−02 | 5.3605E−02 | 5.8675E−02 | −3.9699E−02 | −4.6028E−02 |
| R5 | 0.0000E+00 | −5.1698E−02 | −6.9396E−02 | 4.4961E−02 | 7.3471E−03 | 1.8200E−04 | −6.9051E−02 | 4.0201E−02 |
| R6 | −1.1212E+01 | 3.7114E−03 | −2.6628E−03 | −1.2000E−03 | −4.5832E−03 | −1.8083E−03 | 7.6590E−04 | −1.1586E−03 |
| R7 | −1.4912E+01 | −1.0217E−01 | 2.9296E−02 | 1.5422E−02 | −7.2754E−04 | −1.8909E−03 | −9.2061E−04 | −1.7158E−03 |
| R8 | −6.0490E+00 | −1.0988E−01 | 1.7047E−01 | 1.0906E−01 | 5.8165E−03 | −6.8996E−04 | −8.2754E−04 | 1.3469E−03 |
| R9 | 6.7066E+00 | −2.0703E−02 | −1.6320E−02 | 4.8333E−03 | −4.4349E−03 | 1.0426E−03 | −2.5533E−04 | 1.1307E−04 |
| R10 | −3.1912E+00 | −5.9920E−02 | 2.0449E−02 | 4.6582E−03 | −1.7082E−03 | 3.0676E−05 | 1.6690E−05 | 1.6922E−06 |
| R11 | 0.0000E+00 | −5.3894E−02 | 1.2781E−02 | −1.2870E−03 | 8.0574E−05 | −3.0691E−06 | −2.0019E−07 | 2.4316E−08 |
| R12 | −5.8437E+00 | −3.7062E−02 | 7.8693E−03 | −1.2557E−03 | 9.6674E−05 | −1.2194E−06 | −3.9614E−07 | 2.5411E−08 |

Herein, K is a conic coefficient, A4, A6, A8, A10, A12, A14, A16 are aspheric surface coefficients.

IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

For convenience, an aspheric surface of each lens surface uses the aspheric surfaces shown in the above condition (1). However, the present disclosure is not limited to the aspherical polynomials form shown in the condition (1).

Table 3 and table 4 show design data of inflexion points and arrest points of the camera optical lens 10 lens in Embodiment 1 of the present disclosure. Herein, P1R1 and P1R2 represent the object-side surface and image-side surface of the first lens L1, P2R1 and P2R2 represent the object-side surface and image-side surface of the second lens L2, P3R1 and P3R2 represent the object-side surface and image-side surface of the third lens L3, P4R1 and P4R2 represent the object-side surface and image-side surface of the fourth lens L4, P5R1 and P5R2 represent the object-side surface and image-side surface of the fifth lens L5, and P6R1 and P6R2 represent the object-side surface and image-side surface of the sixth lens L6. The data in the column named "inflexion point position" are vertical distances from the inflexion points arranged on each lens surface to the optic axis of the camera optical lens 10. The data in the column named "arrest point position" are the vertical distances from the arrest points arranged on each lens surface to the optic axis of the camera optical lens 10.

TABLE 3

| | Number(s) of inflexion points | Inflexion point position 1 | Inflexion point position 2 |
|---|---|---|---|
| P1R1 | 1 | 0.575 | |
| P1R2 | 1 | 0.455 | |
| P2R1 | 1 | 0.955 | |
| P2R2 | 2 | 0.715 | 0.895 |
| P3R1 | 0 | | |
| P3R2 | 1 | 0.825 | |
| P4R1 | 1 | 0.295 | |
| P4R2 | 2 | 0.215 | 1.085 |
| P5R1 | 0 | | |
| P5R2 | 1 | 1.085 | |
| P6R1 | 2 | 0.275 | 1.655 |
| P6R2 | 2 | 0.725 | 2.855 |

TABLE 4

| | Number(s) of arrest points | Arrest point position 1 | Arrest point position 2 |
|---|---|---|---|
| P1R1 | 1 | 0.855 | |
| P1R2 | 1 | 0.765 | |
| P2R1 | 0 | | |
| P2R2 | 0 | | |
| P3R1 | 0 | | |
| P3R2 | 0 | | |
| P4R1 | 1 | 0.525 | |
| P4R2 | 1 | 0.365 | |
| P5R1 | 0 | | |
| P5R2 | 0 | | |
| P6R1 | 2 | 0.465 | 2.355 |
| P6R2 | 1 | 1.845 | |

Figure 2:
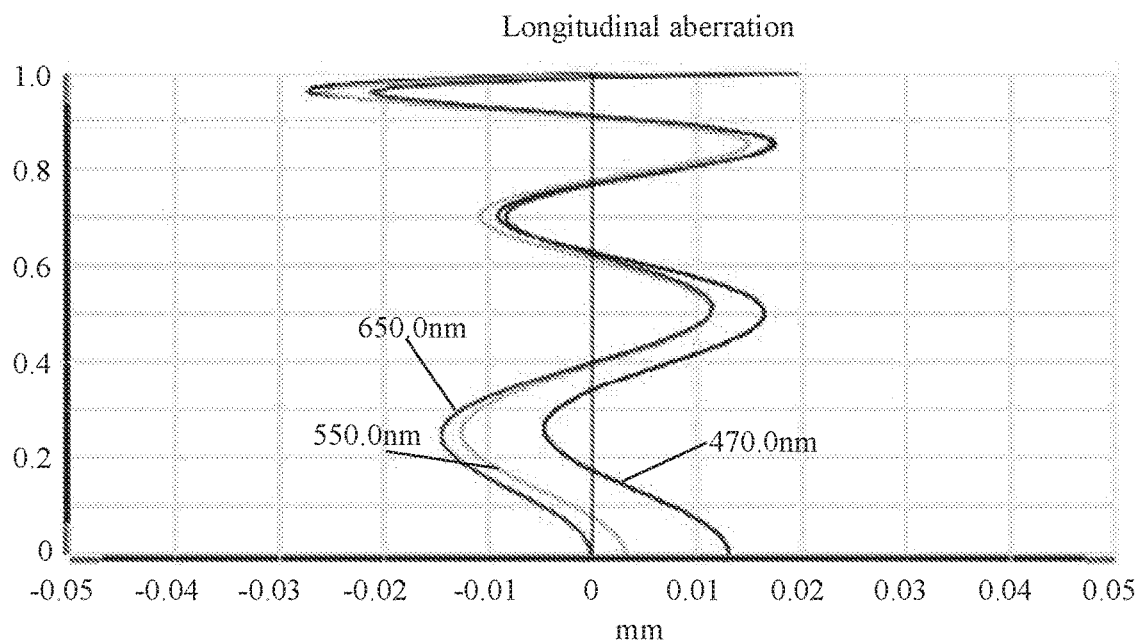
FIG. 2 is a schematic diagram of a longitudinal aberration of the camera optical lens shown in FIG. 1.
Figure 3:
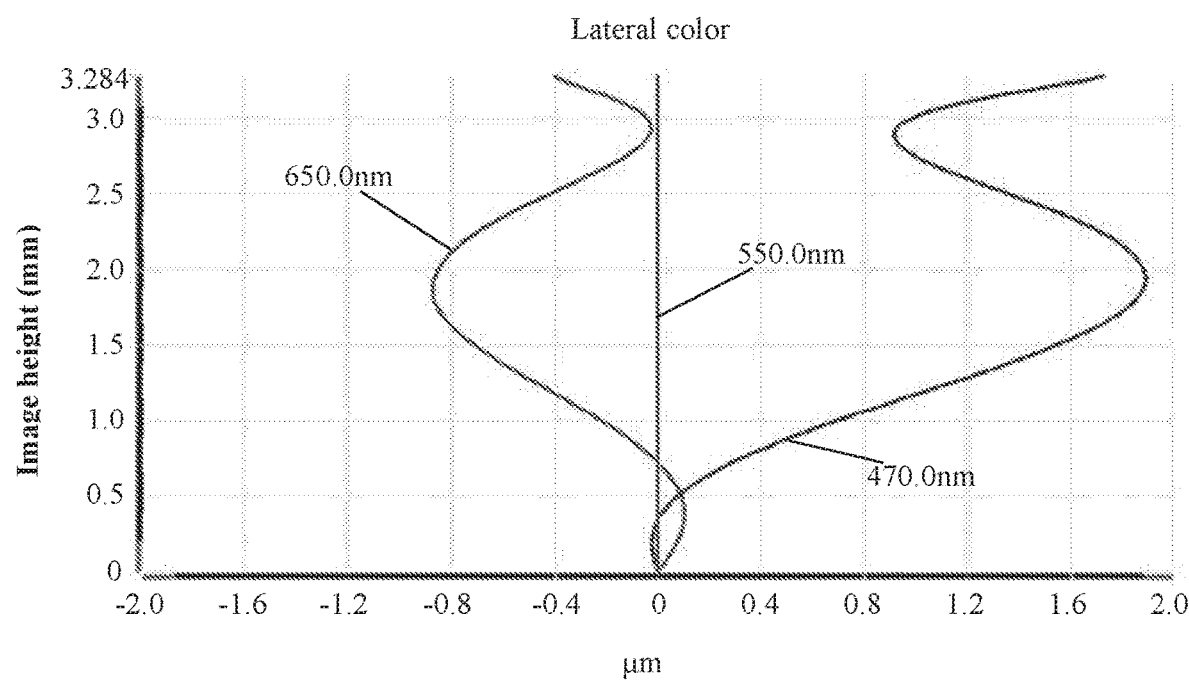
FIG. 3 is a schematic diagram of a lateral color of the camera optical lens shown in FIG. 1.
Figure 4:
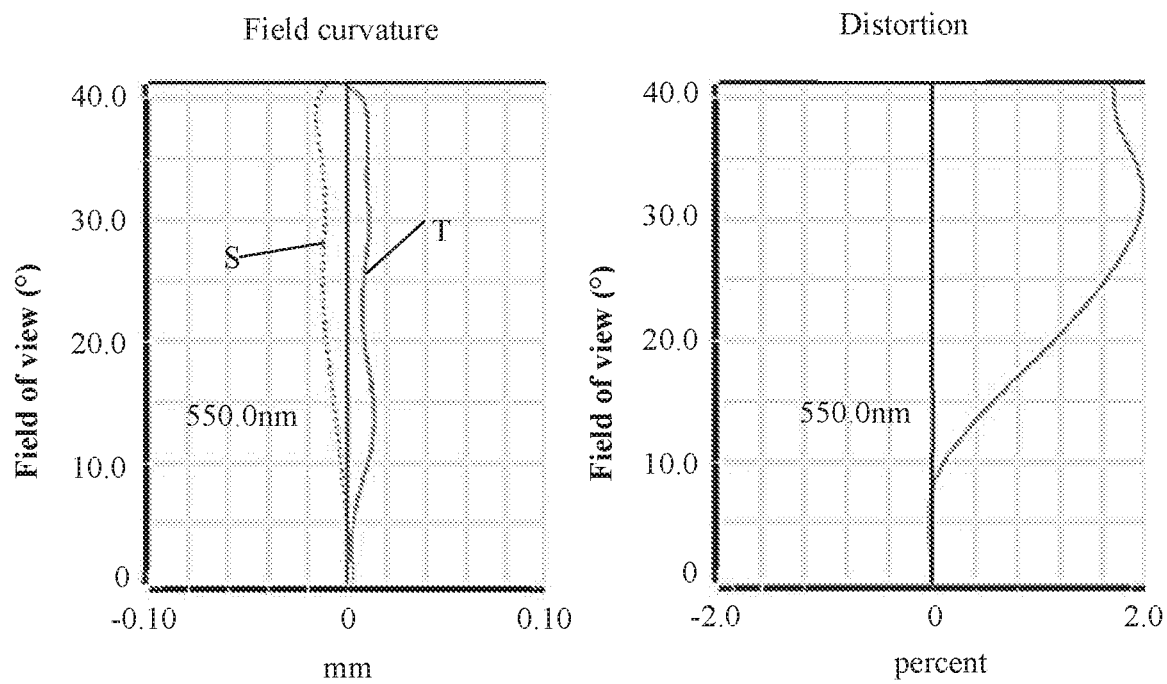
FIG. 4 is a schematic diagram of a field curvature and a distortion of the camera optical lens shown in FIG. 1.
Figure 5:
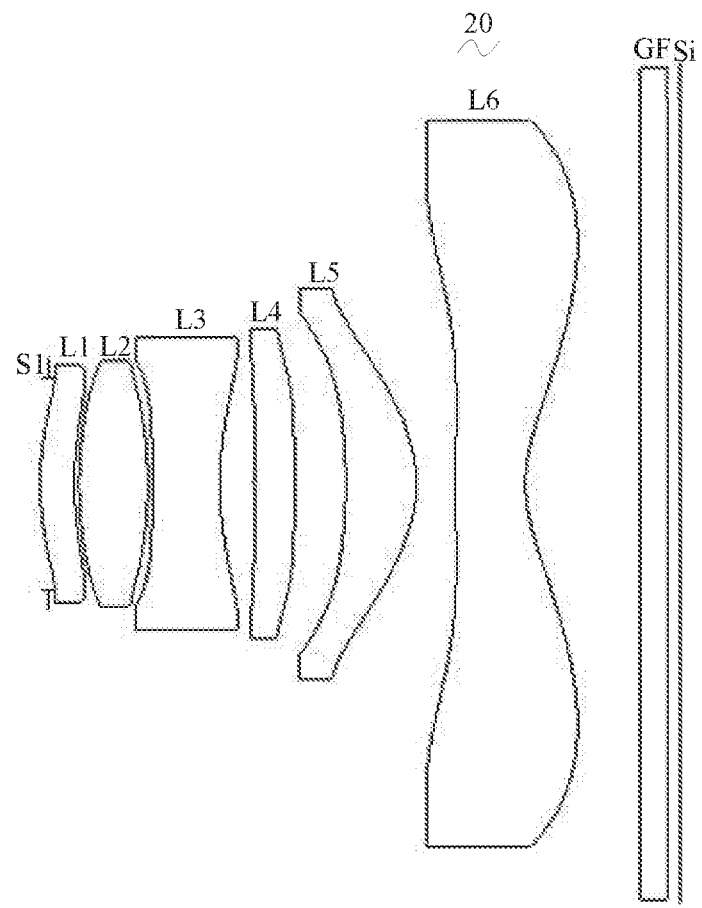
FIG. 5 is a schematic diagram of a structure of a camera optical lens in accordance with Embodiment 2 of the present disclosure.

FIG. 2 and FIG. 3 show a longitudinal aberration and a lateral color of light with wavelengths of 470.0 nm, 550.0 nm, and 650.0 nm passes the camera optical lens 10 in Embodiment 1. FIG. 4 shows a field curvature and a distortion schematic diagram after light with a wavelength of 550.0 nm passes the camera optical lens 10 in Embodiment 1, a field curvature S in FIG. 4 is a field curvature in a sagittal direction, T is a field curvature in a tangential direction.

Table 13 in the following shows various values of Embodiments 1, 2, 3 and values corresponding to the parameters which are already specified in the conditions.

As shown in Table 13, Embodiment 1 satisfies the various conditions.

In this embodiment, an entrance pupil diameter of the camera optical lens is 1.756 mm, an image height of 1.0H is 3.284 mm, and an FOV (field of view) in a diagonal direction is 82.49°. Thus, the camera optical lens has a wide-angle and is ultra-thin. Its on-axis and off-axis aberrations are fully corrected, thereby achieving excellent optical characteristics.

Embodiment 2

Embodiment 2 is basically the same as Embodiment 1, and the meaning of its symbols is the same as that of Embodiment 1, in the following, only differences are described.

Table 5 and table 6 show design data of a camera optical lens 20 in Embodiment 2 of the present disclosure.

TABLE 5

|     | R        | d            | nd        | vd        |
| --- | -------- | ------------ | --------- | --------- |
| S1  | ∞        | d0 = −0.060  |           |           |
| R1  | 2.172    | d1 = 0.269   | nd1 1.6713 | v1 19.24 |
| R2  | 2.363    | d2 = 0.039   |           |           |
| R3  | 3.005    | d3 = 0.538   | nd2 1.5449 | v2 55.93 |
| R4  | −3.160   | d4 = 0.035   |           |           |
| R5  | −16.551  | d5 = 0.534   | nd3 1.6713 | v3 19.24 |
| R6  | 2.855    | d6 = 0.261   |           |           |
| R7  | 18.257   | d7 = 0.319   | nd4 1.6510 | v4 21.51 |
| R8  | −177.406 | d8 = 0.400   |           |           |
| R9  | −4.453   | d9 = 0.558   | nd5 1.5449 | v5 55.93 |
| R10 | −1.063   | d10 = 0.303  |           |           |
| R11 | 13.596   | d11 = 0.551  | nd6 1.5449 | v6 55.93 |
| R12 | 1.148    | d12 = 0.902  |           |           |
| R13 | ∞        | d13 = 0.210  | ndg 1.5168 | vg 64.17 |
| R14 | ∞        | d14 = 0.100  |           |           |

Table 6 shows aspherical surface data of each lens of the camera optical lens 20 in Embodiment 2 of the present disclosure.

TABLE 6

|     | Conic coefficient | Aspheric surface coefficients | | | | | | |
| --- | --- | --- | --- | --- | --- | --- | --- | --- |
|     | k | A4 | A6 | A8 | A10 | A12 | A14 | A16 |
| R1  | −2.9595E−01 | −4.4237E−02 | −1.8238E−01 | 5.0954E−01 | −3.3402E−01 | −1.7374E+00 | 3.3620E+00 | −1.7896E+00 |
| R2  | −2.3916E+00 | −8.9507E−02 | −3.9193E−03 | −3.7303E−02 | −6.5462E−02 | 3.9700E−02 | 1.2280E−01 | −1.4360E−01 |
| R3  | 6.5576E−01 | −4.0432E−02 | 5.1600E−02 | −6.6446E−02 | 1.2666E−01 | 3.4392E−02 | −1.4768E−01 | 4.9843E−02 |
| R4  | 5.3972E−01 | 9.5445E−03 | −3.1415E−02 | −8.4062E−03 | 3.3660E−02 | 4.8724E−02 | −3.5611E−02 | 0.0000E+00 |
| R5  | 0.0000E+00 | −6.1656E−02 | −6.3937E−02 | 1.9377E−02 | −4.0547E−02 | 1.4116E−03 | 2.6877E−02 | 0.0000E+00 |
| R6  | −1.0231E+01 | 4.2490E−03 | −7.0133E−03 | −5.7388E−03 | −5.3891E−04 | 8.1656E−04 | −6.9630E−04 | −1.2487E−03 |
| R7  | 0.0000E+00 | −8.0107E−02 | 2.2643E−02 | 1.4309E−02 | 6.7280E−04 | −1.7657E−03 | −2.2510E−03 | 2.5874E−04 |
| R8  | 0.0000E+00 | −9.7073E−02 | 3.7348E−03 | −8.4670E−04 | 5.7520E−03 | 8.5784E−05 | 4.6735E−04 | 1.0205E−03 |
| R9  | 7.1578E+00 | −2.3071E−02 | −8.1258E−03 | 5.2623E−03 | −4.7379E−03 | 1.4718E−03 | −6.3135E−05 | 1.7137E−04 |
| R10 | −3.1433E+00 | −5.6849E−02 | 1.8494E−02 | 5.4439E−03 | −1.3747E−03 | 6.5267E−05 | −1.1448E−05 | −8.5797E−06 |
| R11 | 0.0000E+00 | −5.5593E−02 | 1.2741E−02 | −1.2842E−03 | 8.0483E−05 | −3.1003E−06 | −1.9883E−07 | 2.4943E−08 |
| R12 | −5.5194E+00 | −3.6819E−02 | 7.8559E−03 | −1.2461E−03 | 9.6978E−05 | −1.3488E−06 | −3.9948E−07 | 2.4608E−08 |

Table 7 and table 8 show inflexion points and arrest point design data of the camera optical lens 20 lens in Embodiment 2 of the present disclosure.

TABLE 7

|      | Number(s) of inflexion points | Inflexion point position 1 | Inflexion point position 2 | Inflexion point position 3 |
| ---- | --- | --- | --- | --- |
| P1R1 | 1 | 0.615 |       |       |
| P1R2 | 1 | 0.535 |       |       |
| P2R1 | 0 |       |       |       |
| P2R2 | 1 | 0.815 |       |       |
| P3R1 | 0 |       |       |       |
| P3R2 | 1 | 0.805 |       |       |
| P4R1 | 3 | 0.245 | 0.915 | 1.055 |
| P4R2 | 1 | 1.035 |       |       |
| P5R1 | 1 | 1.345 |       |       |
| P5R2 | 1 | 1.065 |       |       |
| P6R1 | 2 | 0.345 | 1.685 |       |
| P6R2 | 2 | 0.745 | 2.965 |       |

TABLE 8

|      | Number(s) of arrest points | Arrest point position 1 | Arrest point position 2 |
| ---- | --- | --- | --- |
| P1R1 | 1 | 0.865 |       |
| P1R2 | 1 | 0.815 |       |
| P2R1 | 0 |       |       |
| P2R2 | 0 |       |       |
| P3R1 | 0 |       |       |
| P3R2 | 1 | 1.105 |       |
| P4R1 | 1 | 0.435 |       |
| P4R2 | 1 | 1.205 |       |
| P5R1 | 0 |       |       |
| P5R2 | 0 |       |       |
| P6R1 | 2 | 0.615 | 2.405 |
| P6R2 | 1 | 1.895 |       |

Figure 6:
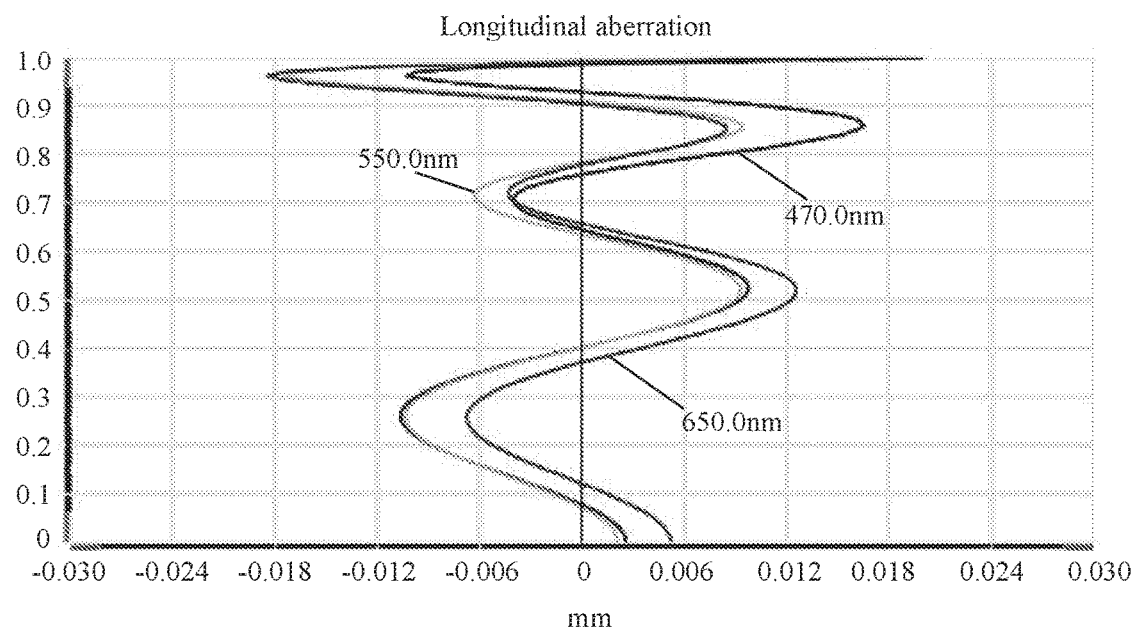
FIG. 6 is a schematic diagram of a longitudinal aberration of the camera optical lens shown in FIG. 5.
Figure 7:
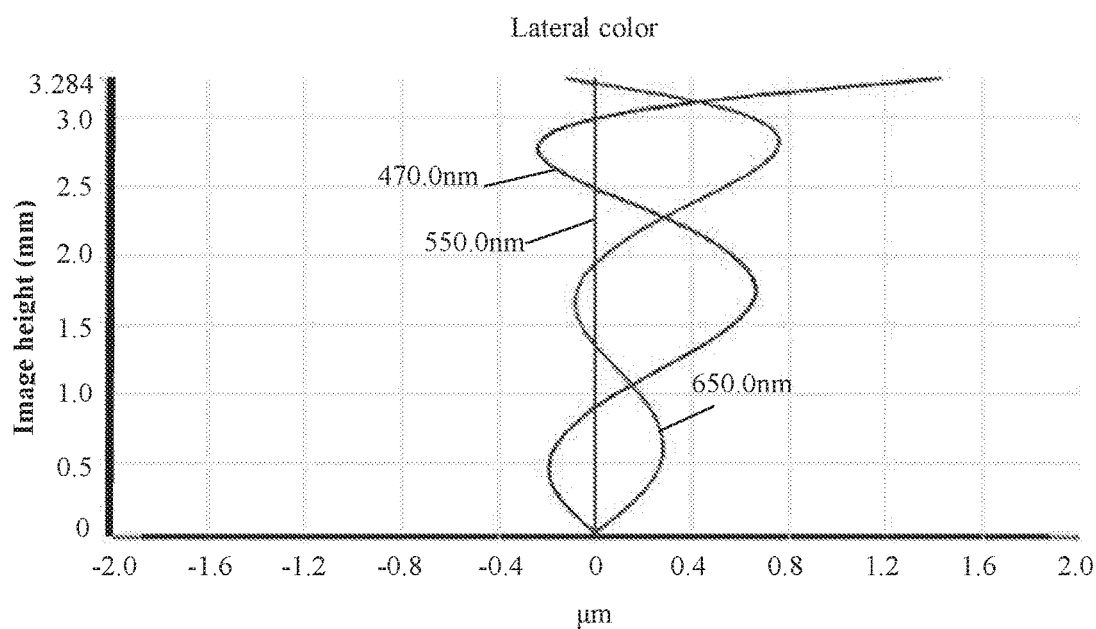
FIG. 7 is a schematic diagram of a lateral color of the camera optical lens shown in FIG. 5.
Figure 8:
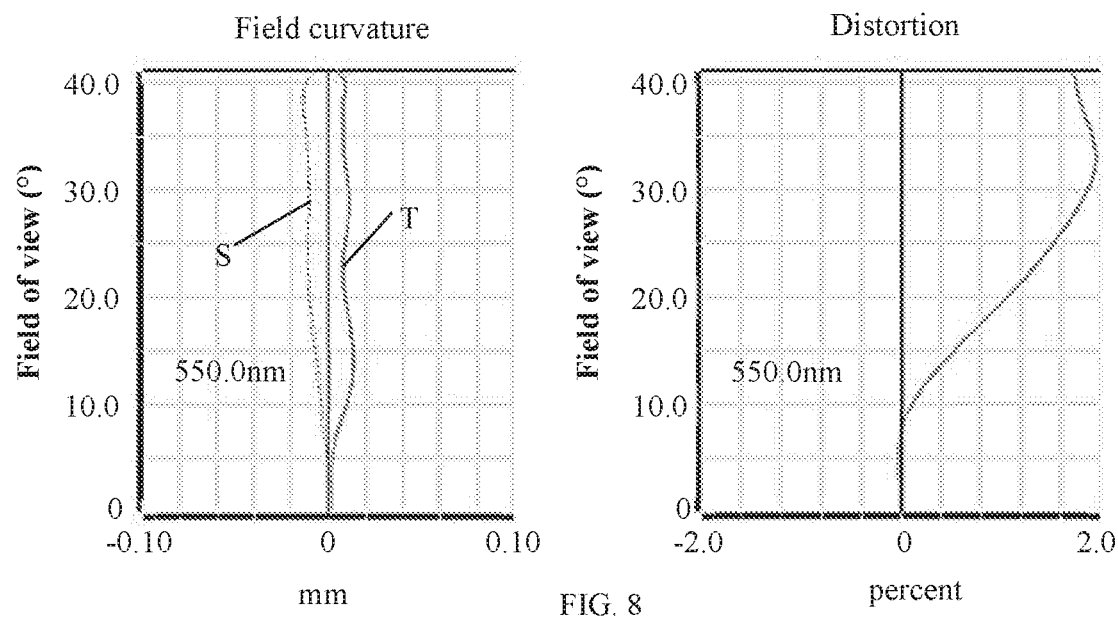
FIG. 8 is a schematic diagram of a field curvature and a distortion of the camera optical lens shown in FIG. 5.
Figure 9:
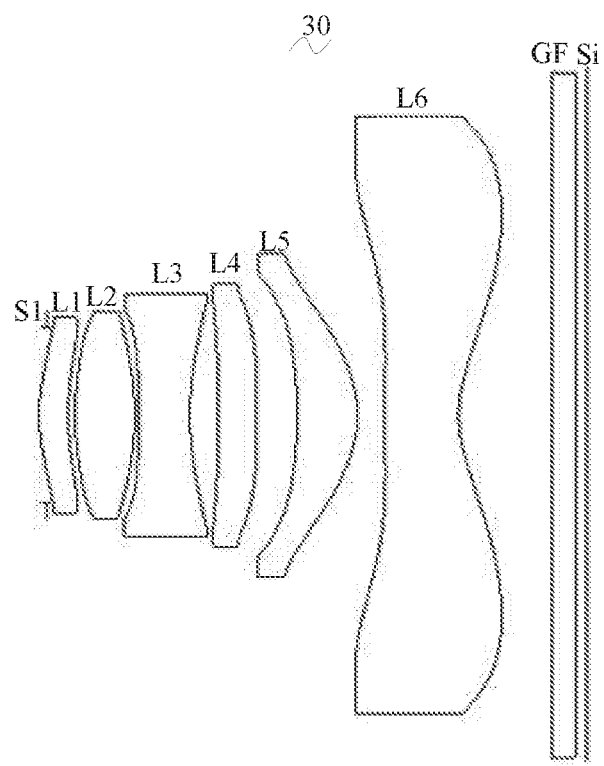
FIG. 9 is a schematic diagram of a structure of a camera optical lens in accordance with Embodiment 3 of the present disclosure.

FIG. 6 and FIG. 7 show a longitudinal aberration and a lateral color of light with wavelengths of 470.0 nm, 550.0 nm, and 650.0 nm passes the camera optical lens 20 in Embodiment 2. FIG. 8 shows a field curvature and a distortion schematic diagram after light with a wavelength of 550.0 nm passes the camera optical lens 20 in Embodiment 2.

As shown in Table 13, Embodiment 2 satisfies the various conditions.

In this embodiment, the entrance pupil diameter of the camera optical lens is 1.683 mm, an image height of 1.0H is 3.284 mm, and an FOV (field of view) in the diagonal direction is 82.22°. Thus, the camera optical lens has a wide-angle and is ultra-thin. Its on-axis and off-axis aberrations are fully corrected, thereby achieving excellent optical characteristics.

Embodiment 3

Embodiment 3 is basically the same as Embodiment 1, and the meaning of symbols in this embodiment is the same as that of Embodiment 1, in the following, only differences are described.

Table 9 and table 10 show design data of a camera optical lens 30 in Embodiment 3 of the present disclosure.

TABLE 9

|    | R       | d           | nd       | vd       |
|----|---------|-------------|----------|----------|
| S1 | ∞       | d0 = -0.059 |          |          |
| R1 | 2.132   | d1 = 0.267  | nd1 1.6713 | v1 19.24 |
| R2 | 2.560   | d2 = 0.065  |          |          |
| R3 | 3.375   | d3 = 0.547  | nd2 1.5449 | v2 55.93 |
| R4 | -3.050  | d4 = 0.036  |          |          |
| R5 | -18.834 | d5 = 0.471  | nd3 1.6713 | v3 19.24 |
| R6 | 2.805   | d6 = 0.263  |          |          |
| R7 | 305.038 | d7 = 0.358  | nd4 1.6510 | v4 21.51 |
| R8 | -28.707 | d8 = 0.379  |          |          |
| R9 | -4.440  | d9 = 0.553  | nd5 1.5449 | v5 55.93 |
| R10 | -1.110 | d10 = 0.253 |          |          |
| R11 | 16.773 | d11 = 0.687 | nd6 1.5449 | v6 55.93 |
| R12 | 1.236  | d12 = 0.867 |          |          |
| R13 | ∞      | d13 = 0.210 | ndg 1.5168 | vg 64.17 |
| R14 | ∞      | d14 = 0.100 |          |          |

Table 10 shows aspherical surface data of each lens of the camera optical lens 30 in Embodiment 3 of the present disclosure.

TABLE 10

| | Conic coefficient | Aspheric surface coefficients | | | | | | |
|---|---|---|---|---|---|---|---|---|
| | k | A4 | A6 | A8 | A10 | A12 | A14 | A16 |
| R1  | -2.7248E-02 | -4.0376E-02 | -1.8072E-01 |  5.0850E-01 | -3.3932E-01 | -1.7348E+00 |  3.3756E+00 | -1.7934E+00 |
| R2  | -1.5412E+00 | -8.3413E-02 |  2.1474E-03 | -3.4593E-02 | -6.2432E-02 |  4.5070E-02 |  1.2899E-01 | -1.5082E-01 |
| R3  |  1.0824E+00 | -3.8719E-02 |  5.3800E-02 | -5.9494E-02 |  1.3188E-01 |  3.0567E-02 | -1.5222E-01 |  5.3167E-02 |
| R4  |  1.4415E-01 |  9.5213E-03 | -2.0928E-02 | -1.0320E-02 |  3.0875E-02 |  4.5718E-02 | -4.3746E-02 |  0.0000E+00 |
| R5  |  0.0000E+00 | -5.4200E-02 | -5.5344E-02 |  2.9070E-02 | -4.6554E-02 | -7.5723E-03 |  2.4932E-02 |  0.0000E+00 |
| R6  | -9.9433E+00 |  8.4202E-03 | -3.7801E-03 | -5.8924E-03 | -1.2652E-04 |  1.6560E-03 | -3.0798E-04 | -4.2361E-04 |
| R7  |  0.0000E+00 | -7.3705E-02 |  2.2859E-02 |  1.4195E-02 |  6.9384E-04 | -1.7499E-03 | -2.0549E-03 |  4.1401E-04 |
| R8  |  0.0000E+0  | -9.1333E-02 |  4.4241E-03 | -1.7335E-03 |  4.6573E-03 | -6.504 1E-04 |  5.7581E-05 |  7.7995E-04 |
| R9  |  7.2813E+00 | -2.4478E-02 | -5.1229E-03 |  5.5144E-03 | -4.9575E-03 |  1.4789E-03 | -5.6022E-05 |  6.8984E-05 |
| R10 | -2.9893E+00 | -5.4991E-02 |  1.6762E-02 |  5.0372E-03 | -1.3510E-03 |  1.2023E-04 |  7.4230E-06 | -5.8356E-07 |
| R11 |  0.0000E+00 | -5.6244E-02 |  1.2720E-02 | -1.2785E-03 |  8.1680E-05 | -3.0081E-06 | -2.0199E-07 |  2.0317E-08 |
| R12 | -5.5547E+00 | -3.6247E-02 |  7.7527E-03 | -1.2323E-03 |  9.7725E-05 | -1.4449E-06 | -4.1433E-07 |  2.3257E-08 |

Table 11 and table 12 show inflexion points and arrest point design data of the camera optical lens 30 lens in Embodiment 3 of the present disclosure.

TABLE 11

| | Number(s) of inflexion points | Inflexion point position 1 | Inflexion point position 2 | Inflexion point position 3 |
|---|---|---|---|---|
| P1R1 | 1 | 0.635 | | |
| P1R2 | 1 | 0.555 | | |
| P2R1 | 1 | 0.975 | | |
| P2R2 | 2 | 0.865 | 0.935 | |
| P3R1 | 0 | | | |
| P3R2 | 1 | 0.905 | | |
| P4R1 | 3 | 0.065 | 0.885 | 1.125 |
| P4R2 | 1 | 1.095 | | |
| P5R1 | 0 | | | |
| P5R2 | 1 | 1.085 | | |
| P6R1 | 2 | 0.315 | 1.715 | |
| P6R2 | 1 | 0.755 | | |

TABLE 12

| | Number(s) of arrest points | Arrest point position 1 |
|---|---|---|
| P1R1 | 0 | |
| P1R2 | 1 | 0.845 |
| P2R1 | 0 | |
| P2R2 | 0 | |
| P3R1 | 0 | |
| P3R2 | 0 | |
| P4R1 | 1 | 0.105 |
| P4R2 | 0 | |
| P5R1 | 0 | |
| P5R2 | 0 | |
| P6R1 | 1 | 0.545 |
| P6R2 | 1 | 1.905 |

Figure 10:
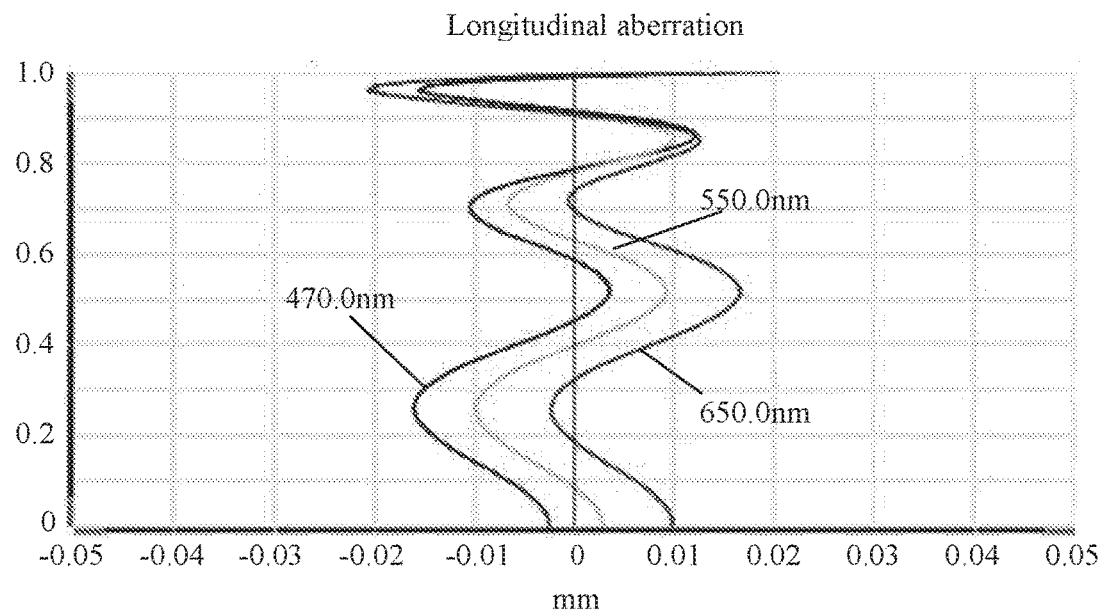
FIG. 10 is a schematic diagram of a longitudinal aberration of the camera optical lens shown in FIG. 9.
Figure 11:
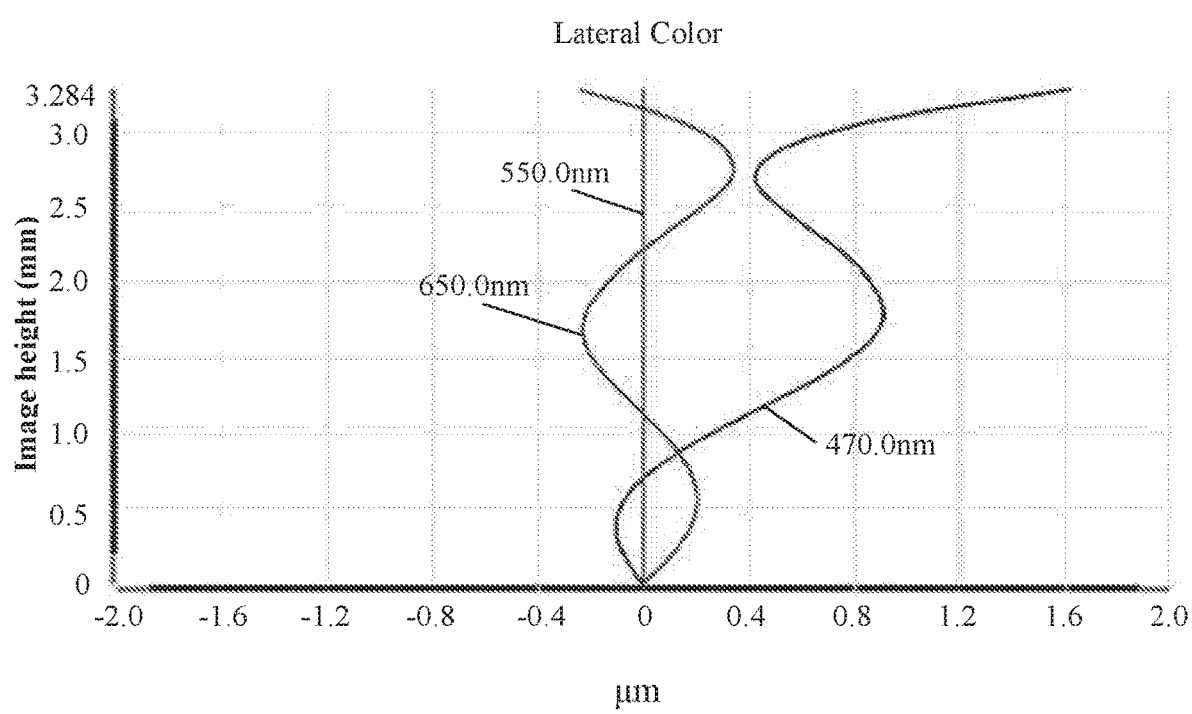
FIG. 11 is a schematic diagram of a lateral color of the camera optical lens shown in FIG. 9.
Figure 12:
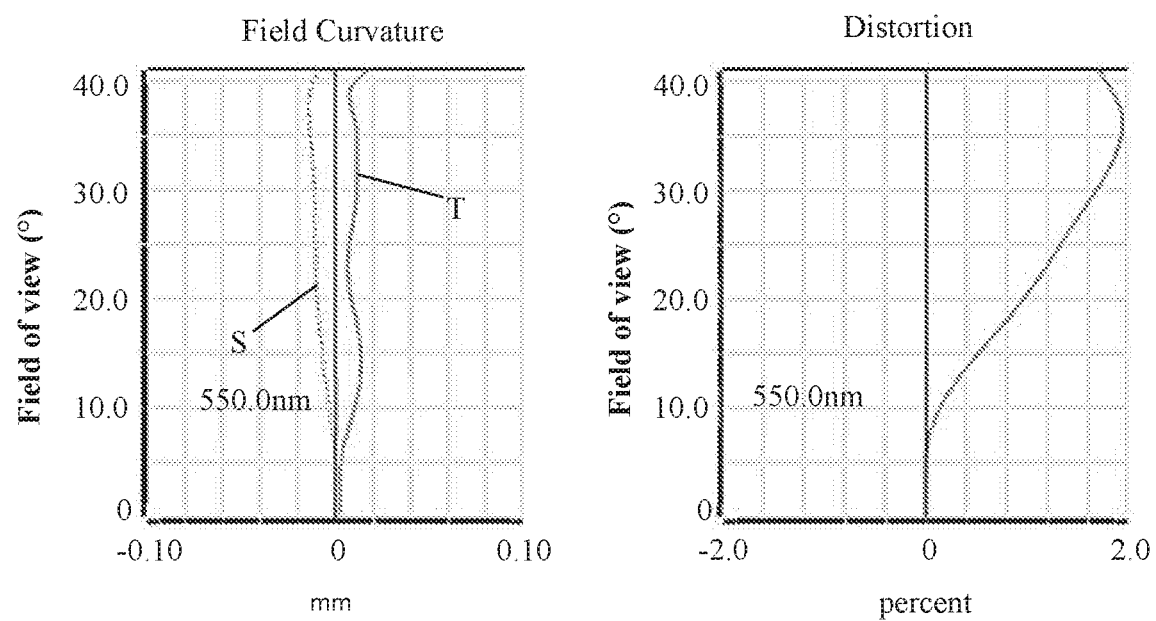
FIG. 12 is a schematic diagram of a field curvature and a distortion of the camera optical lens shown in FIG. 9.

FIG. 10 and FIG. 11 show a longitudinal aberration and a lateral color of light with wavelengths of 470.0 nm, 550.0 nm, and 650.0 nm passes the camera optical lens 30 in Embodiment 3. FIG. 12 shows a field curvature and a distortion schematic diagram after light with a wavelength of 550.0 nm passes the camera optical lens 30 in Embodiment 3.

The following Table 13 shows the values corresponding with the conditions in this embodiment according to the above conditions. Obviously, this embodiment satisfies the various conditions.

In this embodiment, the entrance pupil diameter of the camera optical lens is 1.685 mm, an image height of 1.0H is 3.284 mm, and an FOV (field of view) in the diagonal direction is 82.16°. Thus, the camera optical lens has a wide-angle and is ultra-thin. Its on-axis and off-axis aberrations are fully corrected, thereby achieving excellent optical characteristics.

TABLE 13

| Parameters and conditions | Embodiment 1 | Embodiment 2 | Embodiment 3 |
|---|---|---|---|
| f     |  3.687  |  3.702  |  3.707  |
| f1    | 36.759  | 25.156  | 14.981  |
| f2    |  2.653  |  2.906  |  3.020  |
| f3    | -3.285  | -3.548  | -3.565  |
| f4    | 37.116  | 25.198  | 39.932  |
| f5    |  2.247  |  2.411  |  2.556  |
| f6    | -2.204  | -2.329  | -2.478  |
| f12   |  2.604  |  2.749  |  2.664  |
| FNO   |  2.10   |  2.20   |  2.20   |
| f1/f  |  9.97   |  6.80   |  4.04   |
| R5/d5 | -20.50  | -30.99  | -39.99  |

It can be appreciated by one having ordinary skill in the art that the description above is only embodiments of the present disclosure. In practice, the one having ordinary skill in the art can make various modifications to these embodiments in forms and details without departing from the scope of the present disclosure.

What is claimed is:

1. A camera optical lens comprising, from an object-side to an image-side in sequence: a first lens, a second lens, a third lens, a fourth lens, a fifth lens and a sixth lens; the first lens has a positive refractive power, the second lens has a positive refractive power, the third lens has a negative refractive power, the fourth lens has a positive refractive power, the fifth lens has a positive refractive power, and the sixth lens has a negative refractive power;

wherein a total optical length TTL of the camera optical lens is less than or equal to 5.56 mm;

wherein the camera optical lens satisfies the following conditions:

$4.00 \le f1/f \le 10.00$;

$-40.00 \le R5/d5 \le -20.00$;

where f denotes a focal length of the camera optical lens;

f1 denotes a focal length of the first lens;

R5 denotes a curvature radius of an object-side surface of the third lens;

d5 denotes an on-axis thickness of the third lens.

2. The camera optical lens according to claim 1, wherein the first lens comprises an object-side surface being convex in a partial region and an image-side surface being concave in the paraxial region;

wherein the camera optical lens satisfies the following conditions:

$-90.02 \le (R1+R2)/(R1-R2) \le -7.29$;

$0.03 \le d1/TTL \le 0.08$;

where

R1 denotes a curvature radius of the object-side surface of the first lens;

R2 denotes a curvature radius of the image-side surface of the first lens;

d1 denotes an on-axis thickness of the first lens;

TTL denotes a total optical length from the object-side surface of the first lens to an image surface of the camera optical lens along an optic axis.

3. The camera optical lens according to claim 2, wherein the camera optical lens satisfies the following conditions:

$-56.26 \le (R1+R2)/(R1-R2) \le -9.12$;

$0.04 \le d1/TTL \le 0.06$.

4. The camera optical lens according to claim 1, wherein the second lens comprises an object-side surface being convex in a paraxial region and an image-side surface being convex in the paraxial region;

wherein the camera optical lens satisfies the following conditions:

$0.36 \le f2/f \le 1.22$;

$-0.18 \le (R3+R4)/(R3-R4) \le 0.08$;

$0.05 \le d3/TTL \le 0.16$;

where f2 denotes a focal length of the second lens;

R3 denotes a curvature radius of the object-side surface of the second lens;

R4 denotes a curvature radius of the image-side surface of the second lens;

d3 denotes an on-axis thickness of the second lens;

TTL denotes a total optical length from an object-side surface of the first lens to an image surface of the camera optical lens along an optic axis.

5. The camera optical lens according to claim 4, further satisfying the following conditions:

$0.58 \le f2/f \le 0.98$;

$-0.11 \le (R3+R4)/(R3-R4) \le 0.06$;

$0.09 \le d3/TTL \le 0.13$.

6. The camera optical lens according to claim 1, wherein the object-side surface of the third lens is concave in a paraxial region and an image-side surface of the third lens is concave in the paraxial region; and wherein the camera optical lens satisfies the following conditions:

$-1.92 \le f3/f \le -0.59$;

$0.29 \le (R5+R6)/(R5-R6) \le 1.11$;

$0.05 \le d5/TTL \le 0.16$;

where f3 denotes a focal length of the third lens;

R6 denotes a curvature radius of the image-side surface of the third lens;

TTL denotes a total optical length from an object-side surface of the first lens to an image surface of the camera optical lens along an optic axis.

7. The camera optical lens according to claim 6, further satisfying the following conditions:

$-1.20 \le f3/f \le -0.74$;

$0.46 \le (R5+R6)/(R5-R6) \le 0.89$;

$0.07 \le d5/TTL \le 0.13$.

8. The camera optical lens according to claim 1, wherein the fourth lens comprises an object-side surface being convex in a paraxial region;

wherein the camera optical lens satisfies the following conditions:

$3.40 \le f4/f \le 16.16$;

$-7.67 \le (R7+R8)/(R7-R8) \le 1.24$;

$0.03 \le d7/TTL \le 0.11$;

where f4 denotes a focal length of the fourth lens;

R7 denotes a curvature radius of the object-side surface of the fourth lens;

R8 denotes a curvature radius of an image-side surface of the fourth lens;

d7 denotes an on-axis thickness of the fourth lens;

TTL denotes a total optical length from an object-side surface of the first lens to an image surface of the camera optical lens along an optic axis.

9. The camera optical lens according to claim 8, further satisfying the following conditions:

$5.45 \le f4/f \le 12.93$;

$-4.79 \le (R7+R8)/(R7-R8) \le 0.99$;

$0.05 \le d7/TTL \le 0.08$.

10. The camera optical lens according to claim 1, wherein the fifth lens comprises an object-side surface being concave in a paraxial region and an image-side surface being convex in the paraxial region;

wherein the camera optical lens satisfies the following conditions:

$0.30 \leq f5/f \leq 1.03$;

$0.76 \leq (R9+R10)/(R9-R10) \leq 2.50$;

$0.05 \leq d9/TTL \leq 0.18$;

where f5 denotes a focal length of the fifth lens;
R9 denotes a curvature radius of the object-side surface of the fifth lens;
R10 denotes a curvature radius of the image-side surface of the fifth lens;
d9 denotes an on-axis thickness of the fifth lens;
TTL denotes a total optical length from an object-side surface of the first lens to an image surface of the camera optical lens along an optic axis.

11. The camera optical lens according to claim 10, further satisfying the following conditions:

$0.49 \leq f5/f \leq 0.83$;

$1.21 \leq (R9+R10)/(R9-R10) \leq 2.00$;

$0.09 \leq d9/TTL \leq 0.14$.

12. The camera optical lens according to claim 1, wherein the sixth comprises an object-side surface being convex in a paraxial region and an image-side surface being concave in the paraxial region;

wherein the camera optical lens satisfies the following conditions:

$-1.34 \leq f6/f \leq -0.40$;

$0.55 \leq (R11+R12)/(R11-R12) \leq 1.78$;

$0.05 \leq d11/TTL \leq 0.20$;

where f6 denotes a focal length of the sixth lens;
R11 denotes a curvature radius of the object-side surface of the sixth lens;
R12 denotes a curvature radius of the image-side surface of the sixth lens;
d11 denotes an on-axis thickness of the sixth lens;
TTL denotes a total optical length from an object-side surface of the first lens to an image surface of the camera optical lens along an optic axis.

13. The camera optical lens according to claim 12, further satisfying the following conditions:

$-0.84 \leq f6/f \leq -0.50$;

$0.88 \leq (R11+R12)/(R11-R12) \leq 1.42$;

$0.08 \leq d11/TTL \leq 0.16$.

14. The camera optical lens according to claim 1, wherein the first lens and the second lens has a combined focal length of f12, and the camera optical lens satisfies the following conditions:

$0.35 \leq f12/f \leq 1.11$.

15. The camera optical lens according to claim 14, further satisfying the following condition:

$0.57 \leq f12/f \leq 0.89$.

16. The camera optical lens according to claim 1, wherein the total optical length TTL of the camera optical lens is less than or equal to 5.31 mm.

17. The camera optical lens according to claim 1, wherein an F number of the camera optical lens is less than or equal to 2.27.

18. The camera optical lens according to claim 17, wherein the F number of the camera optical lens is less than or equal to 2.22.

* * * * *